(12) United States Patent
Lique

(10) Patent No.: US 9,300,847 B2
(45) Date of Patent: Mar. 29, 2016

(54) DIGITAL CAMERA LENS GUARD AND USE EXTENDER

(71) Applicant: Roy Lique, Walnut, CA (US)

(72) Inventor: Roy Lique, Walnut, CA (US)

(*) Notice: Subject to any disclaimer, the term of this patent is extended or adjusted under 35 U.S.C. 154(b) by 175 days.

(21) Appl. No.: 14/028,786

(22) Filed: Sep. 17, 2013

(65) Prior Publication Data

US 2015/0077626 A1  Mar. 19, 2015

(51) Int. Cl.
*H04N 5/225* (2006.01)
*G03B 17/12* (2006.01)

(52) U.S. Cl.
CPC ........... *H04N 5/2252* (2013.01); *H04N 5/2254* (2013.01); *G03B 17/12* (2013.01)

(58) Field of Classification Search
CPC ...... G03B 17/12; G03B 17/14; G03B 17/565; H04N 5/2254
USPC ............ 396/71, 544, 611, 612; 359/811, 819, 359/822, 826, 823
See application file for complete search history.

(56) References Cited

U.S. PATENT DOCUMENTS

| | | | |
|---|---|---|---|
| 2,953,970 A * | 9/1960 | Maynard | 359/611 |
| 3,614,196 A | 10/1971 | Schlapp | |
| 3,752,569 A * | 8/1973 | Nelson et al. | 352/139 |
| 3,840,883 A | 10/1974 | Choate | |
| 3,909,107 A | 9/1975 | Numbers | |
| 4,137,540 A | 1/1979 | Curtis | |
| 4,295,706 A | 10/1981 | Frost | |
| 4,384,767 A | 5/1983 | Kawai | |
| 4,533,212 A | 8/1985 | Shimizu | |
| 5,126,881 A | 6/1992 | Crema | |
| 5,208,624 A * | 5/1993 | MacKay | 396/544 |
| 5,640,630 A * | 6/1997 | Hattan | 396/342 |
| 6,243,540 B1 | 6/2001 | Kume | |
| 7,031,081 B2 | 4/2006 | Petroff | |
| 7,088,918 B1 * | 8/2006 | Spencer | 396/432 |
| 7,161,749 B2 | 1/2007 | Sakurai | |
| 7,359,131 B1 | 4/2008 | Gutierrez | |
| 7,386,229 B2 | 6/2008 | Schmidt | |
| 7,450,325 B2 * | 11/2008 | Yamashita et al. | 359/830 |
| 7,813,632 B2 * | 10/2010 | Laganas et al. | 396/71 |
| 7,813,639 B2 | 10/2010 | Yoneji | |
| 7,982,981 B2 | 7/2011 | Fukino | |
| 8,045,277 B2 | 10/2011 | Iwasaki | |
| 8,054,545 B2 | 11/2011 | Cheng | |
| 8,111,984 B2 | 2/2012 | Wood | |
| 8,593,742 B2 * | 11/2013 | Takahashi | 359/819 |
| 2004/0252987 A1* | 12/2004 | Kobayashi | 396/6 |
| 2008/0205881 A1* | 8/2008 | Sakurai | G02B 7/14 396/530 |
| 2009/0109558 A1* | 4/2009 | Schaefer | 359/827 |
| 2012/0236424 A1* | 9/2012 | Yang | G02B 7/022 359/819 |
| 2013/0094101 A1* | 4/2013 | Oguchi | 359/745 |
| 2013/0129335 A1* | 5/2013 | Gainer | 396/144 |
| 2013/0230309 A1* | 9/2013 | Porter et al. | 396/432 |

* cited by examiner

*Primary Examiner* — Christopher Mahoney

(57) ABSTRACT

A digital camera lens guard and use extender to: extend the picture-taking capacities of the digital camera by using different camera filters; enable the digital camera to take pictures of the images formed at the eyepiece of a sighting device; protect the camera lens from dust, moisture, and contaminations; make the digital camera usable as an industrial tool; allow the digital camera to be used in photographing activities such as surveillance, sports, past times, research, astronomy; and maintain the original functions of the digital camera.

3 Claims, 7 Drawing Sheets

DIGITAL CAMERA LENS GUARD AND USE EXTENDER

CROSS REFERENCE TO RELATED APPLICATIONS

This application claims the benefit of provisional patent application Ser. No. 61/849,349, filed Jan. 25, 2013 by the present inventor.

BACKGROUND PRIOR ART

The following is a tabulation of some prior arts that presently appear barely relevant to the embodiments of the digital camera lens guard and use extender.

U.S. PATENTS

| Pat. No. | Title | Issue Date | Patentee |
| --- | --- | --- | --- |
| 8,111,984 | Matte box assembly | Feb. 7, 2012 | Wood; Dennis |
| 8,054,545 | Lens hood for a camera lens | Nov. 8, 2011 | Cheng; Ming-Chung |
| 7,813,639 | Camera cover | Oct. 12, 2010 | Yoneji; Osamu |
| 6,243,540 | Lens barrel assembly | Jun. 5, 2001 | Kume; Hideaki |
| 5,126,881 | Lens hood for a photographic lens | Jun. 30, 1992 | Crema; Rolf |
| 4,533,212 | Accessory holding device for optical instrument | Aug. 6, 1985 | Shimizu; Seiichi |
| 4,384,767 | Clamping device for camera accessory or hood | May 24, 1983 | Kawai; Tohru |
| 4,295,706 | Combined lens cap and sunshade for a camera | Oct. 20, 1981 | Frost; George H. |
| 4,137,540 | Camera matte box | Jan. 30, 1979 | Curtis; Jack |
| 3,909,107 | Hood for the lens of optical instruments with pivotally mounted lens cover | Sep. 30, 1975 | Numbers; Jody L. |
| 3,840,883 | CAMERA LENS HOOD | Oct. 8, 1974 | Choate; J. Robert |
| 3,614,196 | COMBINED LENS HOOD AND FILTER SUPPORT | Oct. 19, 1971 | Schlapp; Werner |

In the absence of significant relevance between prior arts and the embodiments of the digital camera lens guard and use extender, the use and benefits of the latter are discussed to create and present a new line of products principally dedicated to digital cameras.

The embodiments of the digital camera lens guard and use extender are in the field of cameras. More particularly, the embodiments extend and expand the capacities of a digital camera while also protecting the camera's lens. Capacities expansion is done with older as well as newer hardware, or a combination of both. Where applicable, expansion will also be done with software.

While the camera market is flooded with new camera models every year, it is also being depleted by obsolescence due to incompatibility with new software and hardware. It is also depleted by mere dislikes of older models and the accessories that come with them. Phone cameras also diminish the popularity of digital cameras. Some victims of obsolescence include multi-image lenses, fisheye lenses, macro and telephoto lenses, square-shaped filters, over-sized and under-sized filters, fog and snow lenses, so on so forth.

Interchangeability of accessories between the digital camera and certain models of expensive cameras, is rare. The digital camera's lack of threads accounts for threaded accessories being almost exclusive monopolies of certain camera models. Some exciting photographs are taken using threaded accessories. Making the interchangeability problem more obvious is the fact that threads come in either metric or English.

Notwithstanding the additional sophisticated features coming with new cameras, there are still missed capacities that one would like to have in the digital camera. Examples are documenting an event happening too far from the viewer, or a past time too dangerous for the viewer to come close to the subject.

The additional new features that come with the later digital camera models include expensive electronics that need more protection. The entry of dust, moisture, and other contaminations into the lens area must be minimized in order to maintain the digital camera in an efficient working order. By engaging an embodiment of the digital camera lens guard and use extender to the digital camera and screwing in a camera filter, ample protection of the camera electronics is already provided.

The digital camera equipped with the embodiment of the digital camera lens guard and use extender, meets both the camera users' needs for additional camera capacities and lens and electronics protection without investing in expensive equipments.

SUMMARY

Functionally, the digital camera equipped with an embodiment of the digital camera lens guard and use extender compares with the more expensive models. The embodiment concentrates on enhancing the capacities of the digital camera and protecting its electronics.

With different size adapter rings at the ends of the primary ring of the embodiment, a significant number of camera filters can be used. Obsolete and old camera filters are given new life because they can be used again. With proper adaptations, lenses from other camera models may now be used with the digital camera.

In conjunction with telescopes, binoculars, microscopes and other sighting devices, the digital camera can serve as a tool in industrial applications. More photo opportunities become available for the digital camera user because of the expanded capacities provided by sighting devices.

Aside from being used as industrial tool, the digital camera can now be used in other applications like law enforcement, crowd monitoring, event reporting, safety applications, research, and fast sports. Moreover, the embodiment of the digital camera lens guard and use extender can be used on different camera brands and models. Consequently, investment in expensive equipments is postponed or skipped entirely for a while.

The digital camera is equipped with sensitive electronics. The chance of the digital camera being damaged due to the entry of dust, moisture, and other contaminations into the lens area is minimized with the use of the embodiment of the digital camera lens guard and use extender. Physical damage to the digital camera due to being dropped, bumped, and hit is also minimized The digital camera remains portable despite the addition of the ring that comes with the camera mount assembly.

DRAWINGS

Figures

REFERENCE NUMERALS

| | |
|---|---|
| 10—anchor ring | 12—anchor hole |
| 14—anchor nut | 16—anchor screw |
| 18—base adapter ring | 20—track mounting ring |
| 22—barrel track | 24—primary ring |
| 26—recess | 28—outer adapter ring |
| 30—inner adapter ring | 32—retaining holes |
| 34—retaining screws | 36—insert holes |
| 38—coupler ring | 40—track end ring |

GLOSSARY

Before the embodiments of the digital camera lens guard and use extender are described, some terms used here need to be defined.

The term "lens guard" refers to an embodiment of the digital camera lens guard and use extender.

The terms "slip type" and "screw type" refer to the action of connecting one component of the digital camera lens guard and use extender to another.

The terms "digital camera(s)" as used in these specifications, refers to a camera designed to be aimed to shoot pictures of optimal color, with ease and automatic adjustments of shutter speed, aperture, focus, and light sensitivity.

The terms "approximate" and "approximately" apply to numeric values and mean close to being exact.

The term "eyepiece" refers to the lens or lens group closest to the eye in an optical instrument.

The term "sighting device(s)" refers to a device used to assist in aligning or aiming weapons, surveying instruments, or other items by sight.

The term "wall" refers to the surface between the outside and inside diameters of a tube or cylinder.

The term "adapter ring(s)" refers to connectors for joining parts or devices having different sizes and designs, enabling them to be mated, fitted, and work together.

The term "camera filter(s)" refers to circular lens screen of plain or dyed gelatin or glass for controlling the rendering of color or for lessening the intensity of light and for protecting the camera lens.

DETAILED DESCRIPTIONS

Figure 1:
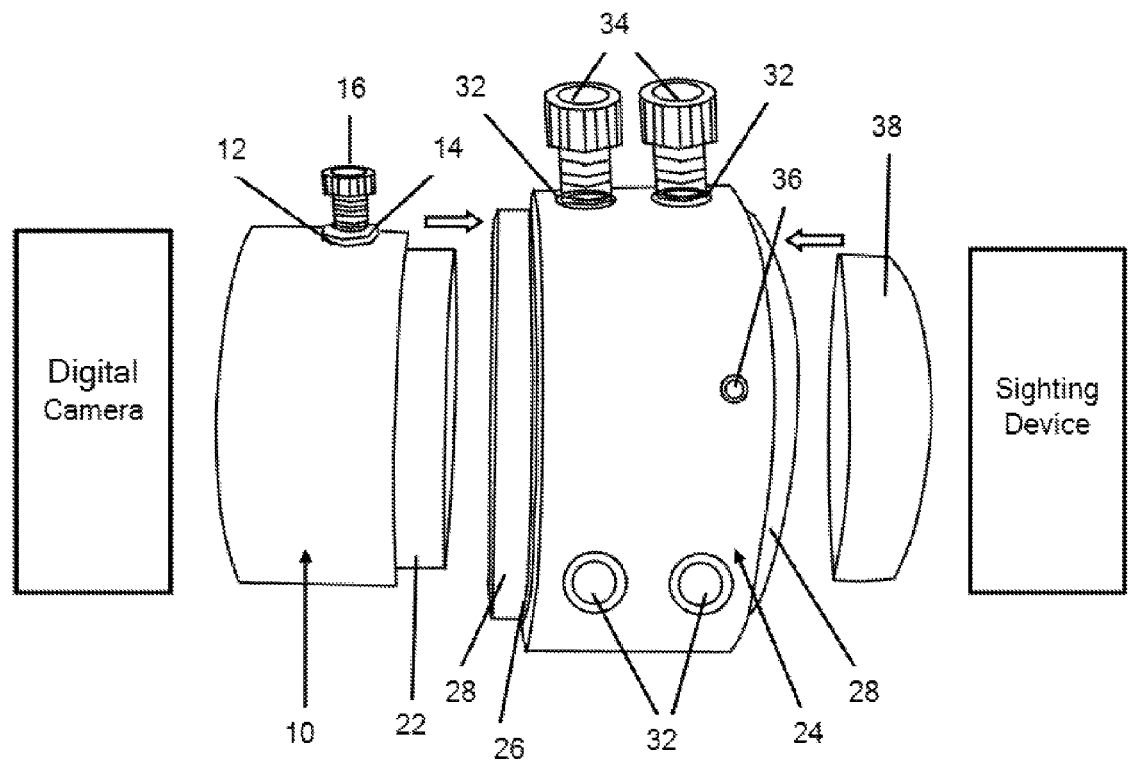
FIG. 1 shows a lens guard with slip type camera mount assembly and a coupler ring. positioned between a camera and a sighting device.
Figure 2:
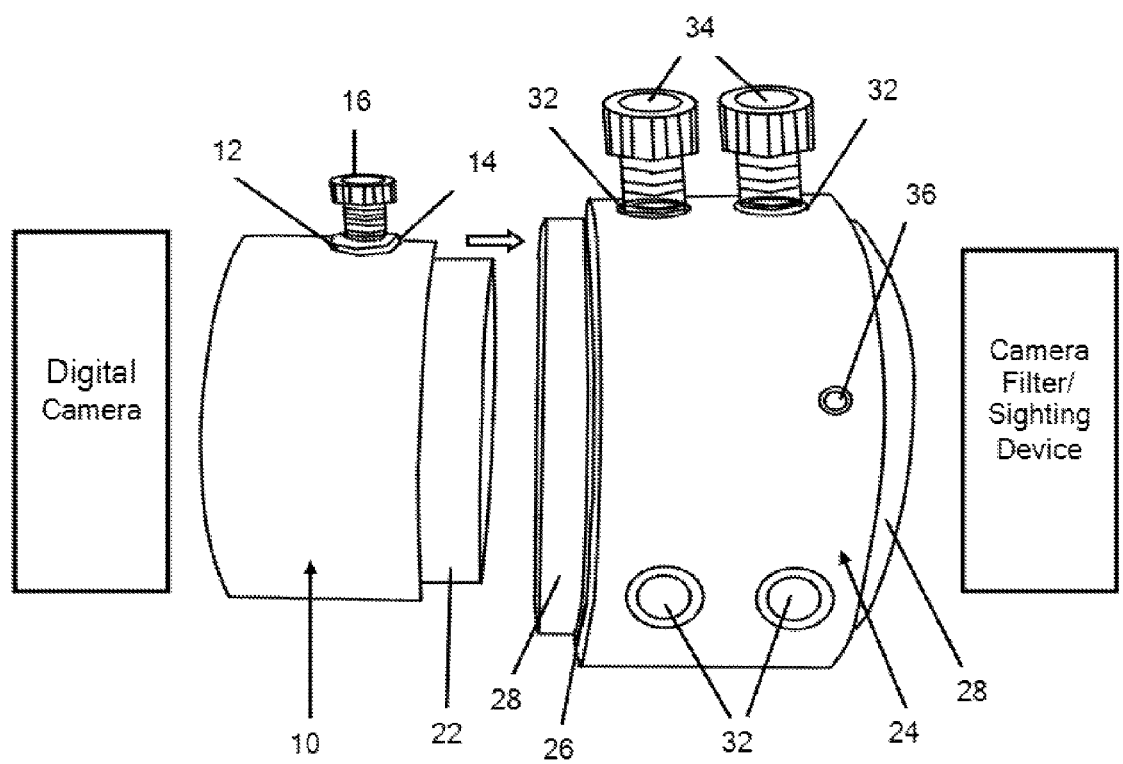
FIG. 2 shows a lens guard with slip type camera mount assembly, positioned between a camera and a camera filter or a sighting device.

FIG. 1 and FIG. 2—First Embodiments

Construction of the embodiments of the digital camera lens guard and use extender described in these specifications is based on the camera barrel size range of 40 mm to 45 mm. All measurements, values, and dimensions are relative to this particular barrel size range. Other size ranges can be used provided their relationships of measurements, values, and dimensions are progressively and proportionally maintained.

Referring now to FIG. 1 and FIG. 2, there are shown embodiments of a digital camera lens guard and use extender having a camera mount assembly, a main housing assembly, and additionally in the case of FIG. 1, a coupler ring 38. The figures further show the position of each embodiment in relation to the digital camera represented by boxed "Digital Camera", and to the attachments represented by boxed "Sighting Device" or boxed "Camera Filter/Sighting Device". When used with the coupler ring 38, the embodiment offers only a single attachment and its position is shown in FIG. 1. With multiple allowable attachments attached one at a time, the position of the embodiment is shown in FIG. 2. The only difference between the embodiments shown in FIG. 1 and FIG. 2 is the presence or absence of the coupler ring 38.

Descriptions of the functions and construction details of the shown embodiments of the digital camera lens guard and use extender follow.

Camera Mount Assembly.

Still referring to FIG. 1 and FIG. 2, an anchor ring 10 of the camera mount assembly is shown as the base that secures the embodiment of the digital camera lens guard and use extender to the digital camera. It is also the basis for most of the sizes, values, measurements, and dimensions of the other components of the embodiment.

Slip Type Camera Mount Assembly.

In more details, still referring to FIG. 1 and FIG. 2, a slip type camera mount assembly comprises the anchor ring 10, an anchor hole 12, an anchor nut 14, an anchor screw 16, and a barrel track 22.

The action of slipping the barrel track 22 into the anchor ring 10 after the anchor ring 10 is mounted on the digital camera, is what "slip type" camera mount assembly refers to. The action, simultaneous with slipping the other end of the barrel 22 to the primary ring 24, secures the embodiment of the digital camera lens guard and use extender to the digital camera.

Anchor Ring 10.

The cylindrical anchor ring 10 of approximately 13 mm (0.512") in length, with approximately 44.7 mm (1.759")

inside diameter, and with approximately 1.5 mm (0.058") wall is cut from 6061 grade aluminum. The wall provides sufficient thickness for attaching the anchor ring 10 upright to the digital camera concentrically with the camera barrel. The anchor hole 12 facilitates the attachment of a pair of sufficiently large anchor screw 16 and anchor nut 14, to the anchor ring 10. The anchor screw 16 and the anchor nut 14 are used to secure the barrel track 22.

Barrel Track 22.

The cylindrical barrel track 22 is also from 6061 grade aluminum, cut to an approximate length of 25.4 mm (1.0"). Approximately one half of its entire length is inserted into the anchor ring 10 to support a secure connection. The other approximate half serves as a flange that inserts into the primary ring 24. The depth of insertion of the flange into the primary ring 24 is adjustable, making it useful in minimizing the formation of circles around pictures taken by the digital camera.

Main Housing Assembly.

In more details still referring to FIG. 1 and FIG. 2, the main housing assembly comprises a cylindrical primary ring 24 with appurtenances. It is in the main housing assembly that the major components of the embodiment of the digital camera lens guard and use extender come together and form a secure connection. Photographing activities take place in the main housing assembly.

Primary Ring 24.

The primary ring 24 accepts and secures a camera filter or a sighting device through the embedded inner adapter ring 30 (not shown) or outer adapter ring 28 at its ends. Additionally in FIG. 1, the primary ring 24 accepts and secures a sighting device through a coupler ring 38.

The primary ring 24 is also cut from 6061 grade aluminum to approximately 25.4 mm (1.0") long. Sufficient space for embedding the commonly used size ranges of adapter rings is provided by its approximate outside diameter of 63.5 mm (2.5") and approximate wall of 6.4 mm (0.252"). Its approximate inside diameter of 44.5 mm (1.752") provides the additional track for the camera barrel to extend and retract without obstruction.

Owing to the identical ends of the primary ring 24 with different size adapter rings, the directions at which the ends point are reversible, offering more opportunities for attaching different camera filters or sighting devices, one at a time.

Adapter Rings.

Size-matched and gender-matched camera filter or sighting device is accepted at either end of the primary ring 24. The embedded adapter rings at the ends of the primary ring 24 immediately provide more opportunities to use different camera filters and sighting devices, one at a time. Since circles around images taken by the digital camera are sometimes caused by the addition of loose adapter rings and camera filters, care is observed that only enough of them are used as needed.

The inside and outside diameters of a target adapter ring are modified as necessary to sufficient sizes so that the adapter ring can be embedded at either end of the primary ring 24. Optionally, its male threads are stripped off. Two types of adapter rings are optionally embedded at either end of the primary ring 24, namely, inner adapter ring 30 and outer adapter ring 28. Their construction details are described as follows:

Inner Adapter Ring 30.

To attach the inner adapter ring 30 at either end of the primary ring 24, an approximately 6.4 mm (0.252") deep recess 26 with sufficient circumference to accept the target inner adapter ring 30, is carved. The inner adapter ring 30 is attached resting at the bottom of the recess 26 with the female threads oriented outwards, using industry grade adhesive.

Outer Adapter Ring 28.

To attach the outer adapter ring 28 at either end of the primary ring 24, an optional approximately 3.2 mm (0.125") deep recess 26 with sufficient circumference to accept the target outer adapter ring 28, is carved. The outer adapter ring 28 is attached resting at the bottom of the recess 26 with the female threads oriented outwards, using industry grade adhesive.

An alternative way to embed the outer adapter ring 28 into the primary ring 24 is to cleanly cut off the recessed portion of the primary ring 24, referring to previous paragraph. Using industry grade adhesive, the outer adapter ring 28 is inserted and attached flushed with the end of the cut off portion. The cut off portion is attached back to the primary ring 24 making sure the female threads are oriented outwards.

The outer adapter ring 28 can also be attached directly to either end of the primary ring 24 without carving the recess 26. It only needs to be stripped off of its male threads and attached to the primary ring 24 with the female threads oriented outwards, using industry grade adhesive.

Stack of Adapter Rings.

Figure 7:
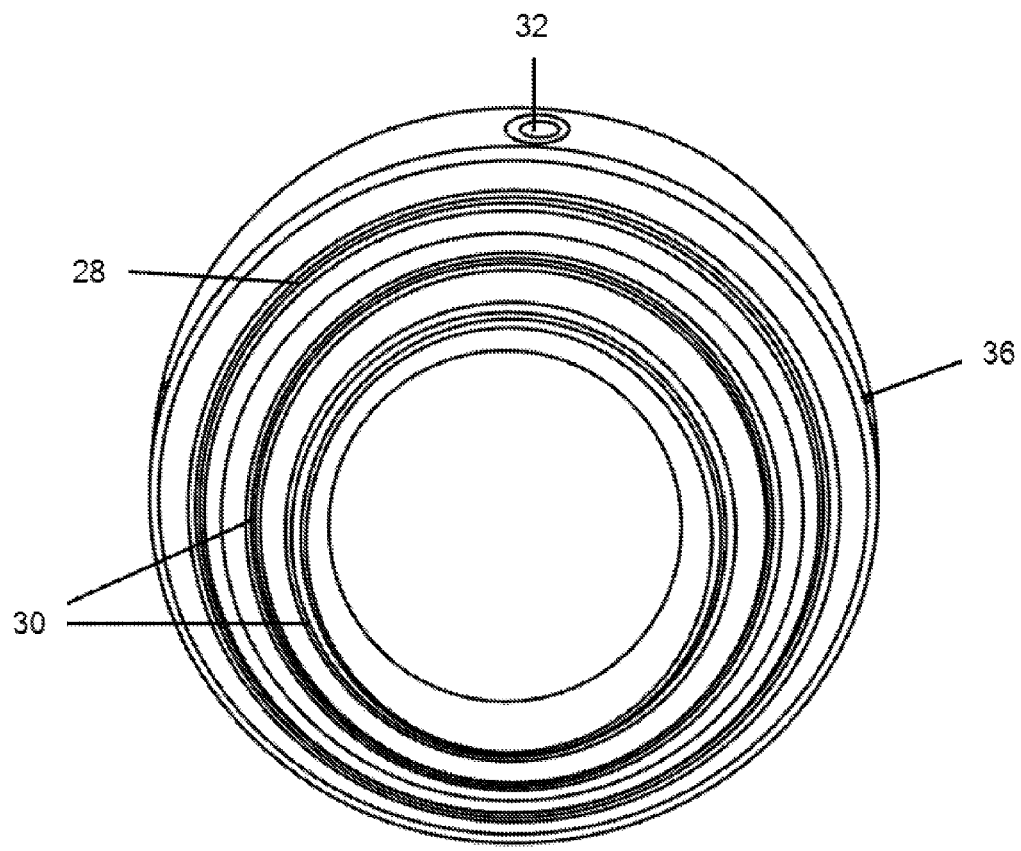
FIG. 7 is an end view of a primary ring with a stack of outer and inner adapter rings.

Building a stack of adapter rings as shown in FIG. 7, follows the steps described for embedding the inner adapter ring 30 and the outer adapter ring 28. The inner adapter rings 30 progressively get smaller as the stack grows, each inner adapter ring 30 resting approximately 6.4 mm (0.252") deeper from the preceding larger one.

Retaining Holes 32 and Retaining Screws 34.

In order to provide ample handling surface, retaining holes 32 of sufficient size are drilled approximately 6.4 mm (0.252") from either end of the primary ring 24. Because at least one retaining screw 34 is used to secure the barrel track 22 and another one to secure the coupler ring 38, the locations of the retaining holes 32 are sufficiently far apart to allow the retaining screws 34 to turn freely.

Insert Holes 36.

The optional insert holes 36 are of sufficient size to accept inserts for expansion and improvements. They are drilled onto the primary ring 24 at desired locations that do not interfere with the outer adapter rings 28, inner adapter rings 30, and retaining screws 34.

Coupler Ring 38.

In more details referring to FIG. 1, the coupler ring 38 provides the connection between the main housing assembly and the sighting device. The sighting device is secured to the main housing assembly by properly inserting its eyepiece into the coupler ring 38 and the coupler ring 38 into the primary ring 24.

The coupler ring 38 is of sufficient size and length, preferably between 25.4 mm (1.0") and 50.8 mm (2.0"), and has an outside diameter closely matching the inside diameter of the primary ring 24. The inside diameter of the coupler ring 38 varies depending on the size of the target eyepiece of the sighting device. If necessary, the coupler ring 38 is machined to alter its inside diameter in order to match it with the size of the eyepiece of the sighting device. The coupler ring 38 is also cut from 6061 grade aluminum.

The construction details of the embodiments of the digital camera lens guard and use extender as shown in FIG. 1 and FIG. 2 are that the embodiments may be made of metal or of any other sufficiently rigid and strong material such as high-strength plastic and the like. Further, the various components of the embodiments of the digital camera lens guard and use extender can be made of different materials from different sources, brands, and styles.

Operation

FIG. 1 and FIG. 2

Referring to FIG. 1 and FIG. 2, either end of the barrel track 22 is inserted into the anchor ring 10. Anchor screw 16 is tightened to secure the barrel track 22.

The open end of the barrel track 22 is inserted into either end of the primary ring 24. It is inserted opposite the end where the camera filter or sighting device is attached. The size and type of camera filter or sighting device determine which end of the primary ring 24 needs to accept and secure the barrel track 22.

Insertion depth of the barrel track 22 into the primary ring 24 is fixed for the distance the camera barrel has to extend. One or more retaining screws 34 are tightened to secure the barrel track 22.

In more details referring to FIG. 1, the eyepiece of a sighting device is inserted into either end of the coupler ring 38. If the outside circumference of the eyepiece is smaller than the inside circumference of the coupler ring 38, a fitting (not shown) is used to make the insertion snugly secure. The open end of the coupler ring 38 is inserted as far as it can go or until it is stopped by the barrel track 22, into the primary ring 24.

Alternatively, the use of the coupler ring 38 can be done away with as shown in FIG. 2. Size-matched and gender-matched camera filter or sighting device is screwed directly to either the outer adapter ring 28 or the inner adapter ring 30 (not shown). If necessary, loose adapter rings are added to find a match between the embedded adapter rings and the target camera filter or sighting device.

In more details referring to FIG. 1 and FIG. 2, as shown, the embodiments of the digital camera lens guard and use extender provide for quick and easy installation of the camera filter or the sighting device to the main housing assembly. They also facilitate their quick and easy mounting and dismounting to and from the digital camera. More size-matched and gender-matched camera filters and sighting devices unusable with the digital camera before, become available now with the use of the outer adapter rings 28 and the inner adapter rings 30.

FIG. 3 and FIG. 4

Additional Embodiments

Figure 3:
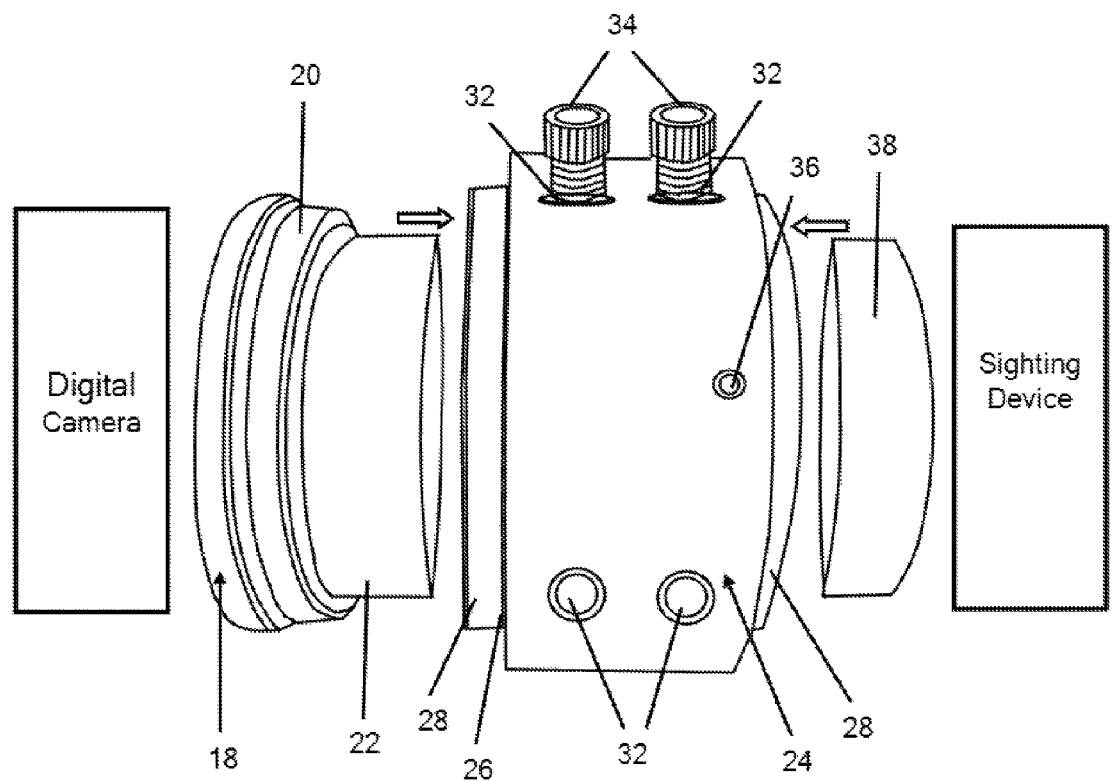
FIG. 3 shows a lens guard with screw type camera mount assembly and a coupler ring, positioned between a camera and a sighting device.
Figure 4:
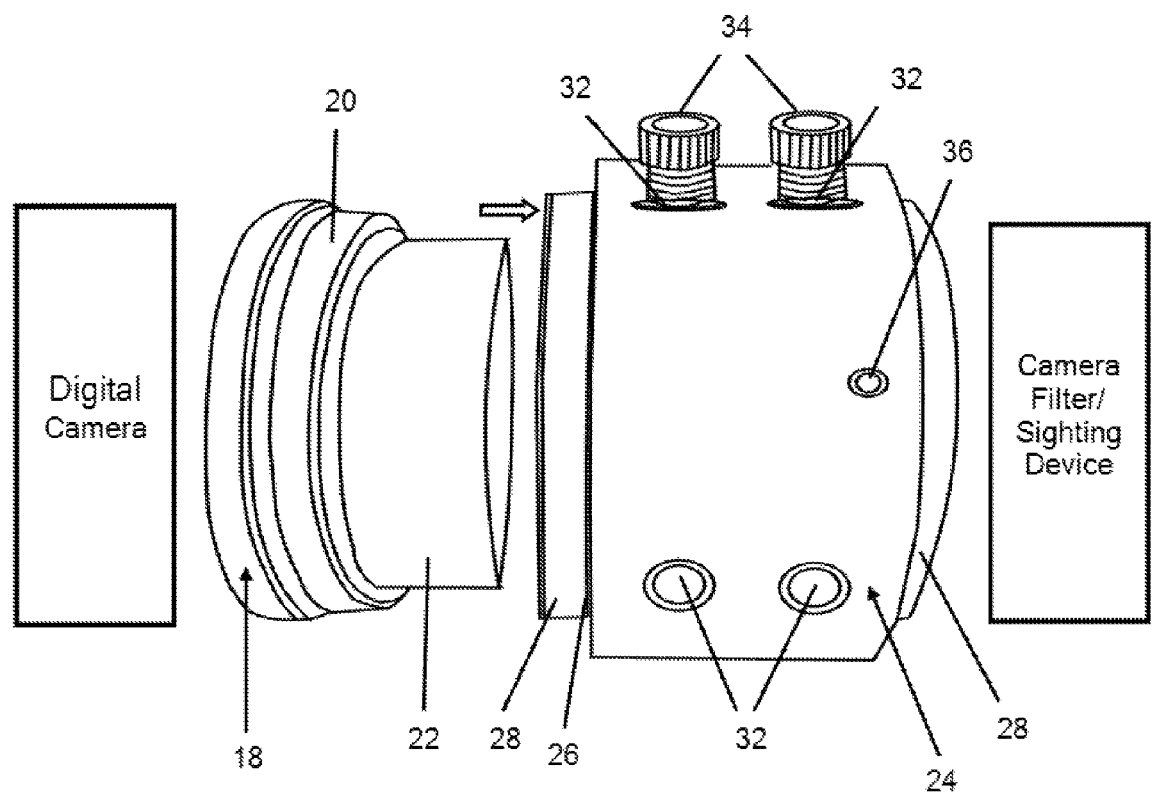
FIG. 4 shows a lens guard with screw type camera mount assembly, positioned between a camera and a camera filter or a sighting device.

Referring now to FIG. 3 and FIG. 4, there are shown embodiments of the digital camera lens guard and use extender having a camera mount assembly, a main housing assembly, and additionally in the case of FIG. 3, a coupler ring 38. The figures further show the position of each embodiment in relation to the digital camera represented by boxed "Digital Camera", and to the attachments represented by boxed "Sighting Device" or boxed "Camera Filter/Sighting Device". When used with the coupler ring 38, the embodiment offers only a single attachment and its position is shown in FIG. 3. With multiple allowable attachments attached one at a time, the position of the embodiment is shown in FIG. 4. The only difference between the embodiments shown in FIG. 3 and FIG. 4 is the presence or absence of the coupler ring 38.

Descriptions of the functions and construction details of the shown embodiments of the digital camera lens guard and use extender follow.

Camera Mount Assembly.

Still referring to FIG. 3 and FIG. 4, a base adapter ring 18 of the camera mount assembly secures the embodiment of the digital camera lens guard and use extender to the digital camera. It is the basis for most of the sizes, values, measurements, and dimensions of the other components of the embodiments.

Screw Type Camera Mount Assembly.

In more details still referring to FIG. 3 and FIG. 4, the screw type camera mount assembly comprises the modified base adapter ring 18 and the configured barrel track 22.

The action of screwing the track mounting ring 20 to the modified base adapter ring 18 after the base adapter ring 18 is mounted on the digital camera, is what "screw type" camera mount assembly refers to. The action, simultaneous with slipping the other end of the barrel 22 to the primary ring 24, secures the embodiment of the digital camera lens guard and use extender to the digital camera.

Base Adapter Ring 18.

Initially, the inside diameter of the base adapter ring 18 is approximately 40 mm (1.575") to 45 mm (1.772") and its outside diameter is approximately 50 mm (1.969"). The sizes are suitable for modification by machining, to circumferentially enclose the camera barrel. With its male threads stripped off, the base adapter ring 18 is attached to the digital camera upright concentrically with the camera barrel and with the female threads oriented outwards, using industry grade adhesive. To allow the camera barrel to extend and retract without obstruction, a space is maintained between the camera barrel and the base adapter ring 18.

Barrel Track 22.

The barrel track 22 is also cut from 6061 grade aluminum to an approximate length of 25.4 mm (1.0"). Using industry grade adhesive, one end is fitted with the modified track mounting ring 20 which is size-matched and gender-matched with the base adapter ring 18. The track mounting ring 20 is made flush with the end of the barrel track 22. The other end serves as a flange that inserts into the primary ring 24. The depth of insertion of the flange into the primary ring 24 is adjustable, making it useful in minimizing the formation of circles around pictures taken by the digital camera.

Main Housing Assembly.

The main housing assembly is identical to that described in the embodiments shown in FIG. 1 and FIG. 2.

Coupler Ring 38.

The coupler ring 38 is identical to that described in the embodiments shown in FIG. 1 and FIG. 2.

The construction details of the embodiments of the digital camera lens guard and use extender as shown in FIG. 3 and FIG. 4 are that the embodiments may be made of metal or of any other sufficiently rigid and strong material such as high-strength plastic and the like. Further, the various components of the embodiments of the digital camera lens guard and use extender can be made of different materials from different sources, brands, and styles.

Operation

FIG. 3 and FIG. 4

Referring to FIG. 3 and FIG. 4, the track mounting ring 20 is screwed into the base adapter ring 18.

The open end of the barrel track 22 is inserted into either end of the primary ring 24. It is inserted opposite the end where the camera filter or sighting device is attached. The size and type of camera filter or sighting device determine which end of the primary ring 24 needs to accept and secure the barrel track 22.

Insertion depth of the barrel track 22 into the primary ring 24 is fixed for the distance the camera barrel has to extend. One or more retaining screws 34 are tightened to secure the barrel track 22.

In more details referring to FIG. 3, the eyepiece of a sighting device is inserted into either end of the coupler ring 38. If the outside circumference of the eyepiece is smaller than the inside circumference of the coupler ring 38, a fitting (not shown) is used to make the insertion snugly secure. The open end of the coupler ring 38 is inserted as far as it can go or until it is stopped by the barrel track 22, into the primary ring 24.

Alternatively, the use of the coupler ring 38 can be done away with as shown in FIG. 4. Size-matched and gender-matched camera filter or sighting device is screwed directly to either the outer adapter ring 28 or the inner adapter ring 30 (not shown). If necessary, loose adapter rings are added to find a match between the embedded adapter rings and the target camera filter or sighting device.

In more details referring to FIG. 3 and FIG. 4, as shown, the embodiments of the digital camera lens guard and use extender provide for quick and easy installation of the camera filter or the sighting device to the main housing assembly. They also facilitate their quick and easy mounting and dismounting to and from the digital camera. More size-matched and gender-matched camera filters and sighting devices unusable with the digital camera before become available now with the use of the outer adapter rings 28 and the inner adapter rings 30.

FIG. 5 and FIG. 6

Alternative Embodiments

Figure 5:
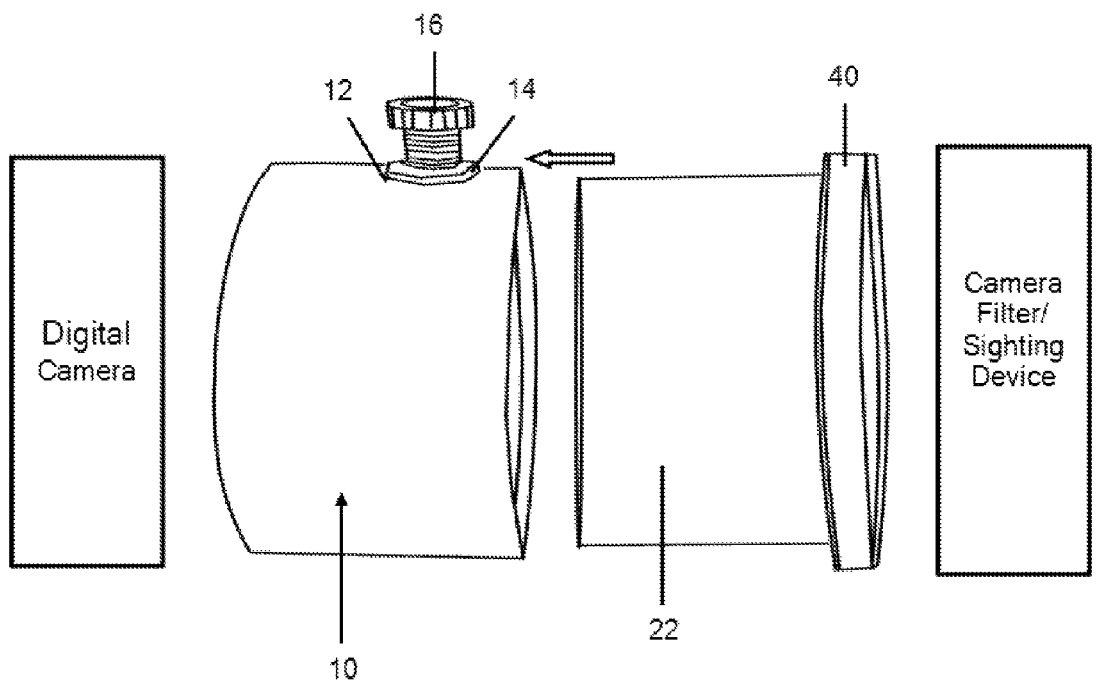
FIG. 5 shows a slip type barrel track directly securing a camera filter or a sighting device, positioned between a camera and a sighting device.
Figure 6:
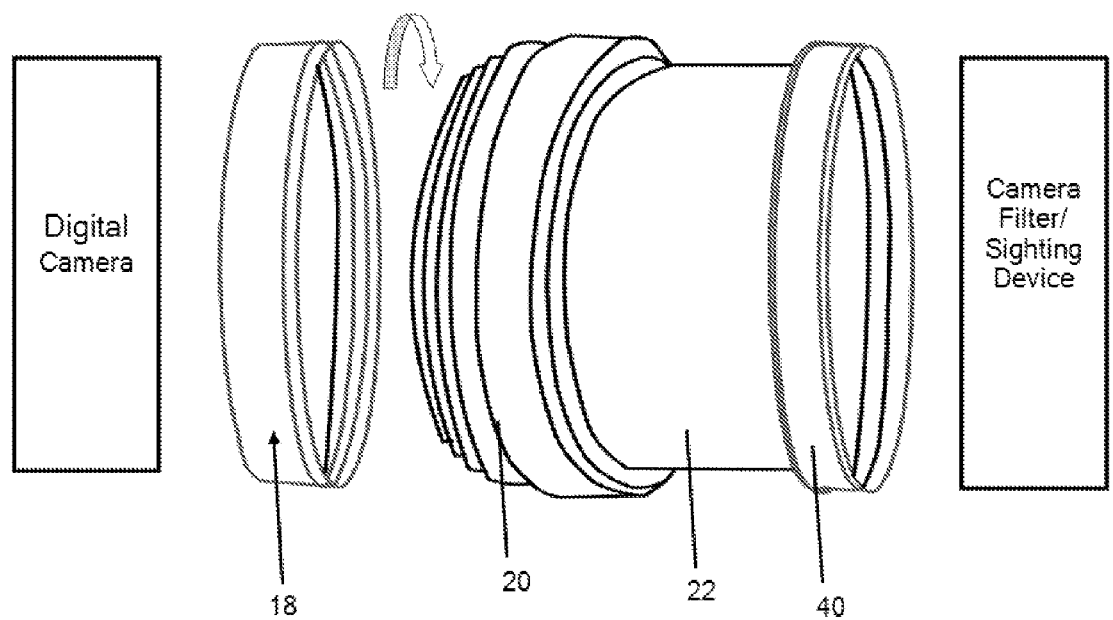
FIG. 6 shows a screw type barrel track directly securing a camera filter or a sighting device, positioned between a camera and a sighting device.

Referring to FIG. 5 and FIG. 6, there are shown simplified embodiments of the digital camera lens guard and use extender. The figures further show the position of each embodiment in relation to the digital camera represented by boxed "Digital Camera". With multiple allowable attachments represented by boxed "Camera Filter/Sighting Device" attached one at a time, the relative positions of the embodiments are also shown in both figures.

In FIG. 5 the end of the barrel track 22 opposite the end that slips into the anchor ring 10 is fitted with a track end ring 40 with the female threads oriented outwards. In FIG. 6, fitting is done at the end opposite that which screws into the base adapter ring 18. In both instances, fitting is done using industry grade adhesive and ensuring that the track end ring 40 is flushed with the end of the barrel track 22. The camera filter or sighting device is screwed directly into the track end ring 40.

The construction details of the embodiments of the digital camera lens guard and use extender as shown in FIG. 5 and FIG. 6 are that the embodiments may be made of metal or of any other sufficiently rigid and strong material such as high-strength plastic and the like. Further, the various components of the embodiments of the digital camera lens guard and use extender can be made of different materials from different sources, brands, and styles.

Referring to FIG. 5 and FIG. 6, as shown, the embodiments of the digital camera lens guard and use extender provide for simple and direct use of camera filters and sighting devices by completely bypassing the main housing assembly.

Advantages

Broadly, from the description above, a number of advantages of most embodiments of the digital camera lens guard and use extender become evident:

(a) The embodiments of the digital camera lens guard and use extender have the advantage of possibly being one of the few dedicated to digital cameras.
(b) Due to its simple design, future changes on the embodiments of the digital camera lens guard and use extender will be easily implemented.
(c) The features added by sighting devices make the digital camera more adaptable to various photo opportunities.
(d) With the added features of a sighting device, the digital camera can be used as an industrial tool.
(e) Mounting and dismounting of an embodiment to and from the digital camera takes only few turns of the track mounting ring or the anchor screw.
(f) The digital camera remains portable despite the addition of a base ring.
(g) Embodiments of the digital camera lens guard and use extender of different sizes can be manufactured for different digital camera types, models, and sighting devices, provided appropriate matching adapter rings are used.
(h) The digital cameras are now able to take pictures previously possible only with the more expensive cameras.
(i) Camera protection extends the life of the digital camera and is accomplished with just a few turns of a camera filter.
(j) Camera users will benefit from innovations and improvements from two different industrial classifications, namely, digital cameras and sighting devices.
(k) With the different size adapter rings fitted at the ends of the primary ring, immediately a large number of camera filters becomes available.
(l) Tripods are used less frequently because of the nature of digital cameras.

CONCLUSION, RAMIFICATIONS, AND SCOPE

Accordingly, a digital camera user will see that a digital camera enabled by the embodiments of the digital camera lens guard and use extender is well adapted to various photo taking sessions. As the embodiments are easy to mount and dismount to and from the digital camera, more photographic events can be recorded.

In terms of functionalities, the market availability of camera filters and sighting devices makes the digital camera comparable with the more expensive types and models. With the option to choose which end of the main housing assembly to attach camera filters and sighting devices, the possibilities become more numerous.

More specifically, the following are few examples of the use of the digital camera enabled by the embodiments of the digital camera lens guard and use extender:

surveillance from a distance when getting close endangers the observer,
observing a phenomenon such as unusual celestial events,
research such as observing the habits of certain insects,
crowd observation such as in parades and demonstrations,
monitoring such as vehicles behaving erratically,
past time such as bird-watching and whale-watching,
safaris such as observing wild animals from a distance,
emergency reporting such as a traffic accident,
fire fighting such as reporting a fire at a distant canyon,
progress report such as of a mountain climber,
fast sports such as tennis matches and basketball games,
traffic surveillance such as monitoring speeding cars,
weather observation such as monitoring snow levels,
crowd safety such as life guarding on the beach, and
law enforcement such as unruly crowd.

While the foregoing written descriptions of the embodiments of the digital camera lens guard and use extender enables one of ordinary skill to make and use what is considered presently to be the best mode thereof, those of ordinary skills will understand and appreciate the existence of variations, combinations, and equivalents of the specific embodiment, method, and examples herein. The digital camera lens guard and use extender should therefore not be limited by the above described embodiments, methods, and examples, but by all embodiments and methods within the scope and spirit of the digital camera lens guard and use extender as claimed.

I claim:

1. A digital camera lens guard and use extender for adding deviant picture-taking capacities to a digital camera, and protecting said camera's lens, barrel, and electronics, comprising:
    a. a camera mount assembly having a circular base and a cylindrical ring of sufficient size and length and a plurality of locking means, for allowing unobstructed movement of said digital camera's barrel,
    b. a main housing assembly having a primary ring of sufficient size and length with a plurality of retaining screws and embed locations for adapter rings on each end, for union with camera filters and sighting devices.

2. The digital camera lens guard and use extender of claim 1 wherein said embed location is a circular recess carved approximately one-eighth to one-fourth inch at each said end of said primary ring of said main housing assembly.

3. The digital camera lens guard and use extender of claim 1 wherein said primary ring of said main housing assembly being inserted with a coupler ring, for securing an eyepiece of a sighting device,
    whereby the digital camera lens guard and use extender adds picture-taking capacities to said digital camera beside that of point-and-shoot method; provides protection for said digital camera's lens, barrel, and electronics; facilitates usage of camera filters, adapter rings, and sighting devices; enables said digital camera to take pictures of images formed at said eyepiece of a sighting device; and allows said digital camera to accept new picture-taking capacities that are introduced in the form of adapter rings.

* * * * *